United States Patent Office 2,927,110
Patented Mar. 1, 1960

2,927,110

PROCESS FOR THE PREPARATION OF AZOMETHINES OF 5-NITRO-2-FORMYL FURAN WITH HYDRAZINE COMPOUNDS

Gabriel Gever, Oxford, and Charles J. O'Keefe, Norwich, N.Y., assignors to The Norwich Pharmacal Company, Norwich, N.Y., a corporation of New York No Drawing. Application January 23, 1958
Serial No. 710,605

6 Claims. (Cl. 260—240)

This invention relates to nitrofurans and aims to provide an improved process for the preparation of the members of a group of closely-related compounds which may be described as azomethines of 5-nitro-2-formyl furan with certain hydrazine compounds. That group includes 5-nitro-2-furaldehyde semicarbazone, N-(5-nitro-2-furfurylidene)-1-aminohydantoin, N-(5-nitro-2-furfurylidene)-3-amino-2-oxazolidone and N-(5-nitro-2-furfurylidene) - 3 - amino - 5 - (N - morpholinyl)methyl - 2 - oxazolidone. Each of those compounds is distinguished by its outstanding chemotherapeutic activity.

We have discovered that it is possible to prepare each of those compounds in excellent yield and a high degree of purity through a process which permits the use of 5-nitro-2-furaldoxime as a starting material. That compound can be readily obtained. It is non-corrosive, can be handled easily, and may be caused to react with the other compounds used in the practice of our method in a simple expeditious manner to produce a high yield of a relatively pure end product. In the practice of our invention, 5-nitro-2-furaldoxime is caused to react with one of the following hydrazine compounds, the particular compound selected depending upon the end product desired:

(A) A semicarbazone of an aldehyde or ketone;
(B) 1-aminohydantoin or a carbonyl derivative thereof;
(C) 3-amino-2-oxazolidone or an acylated or carbonyl derivative thereof;
(D) 2-semicarbazidoacetic acid or a carbonyl derivative thereof; and
(E) 3-amino-5-tertiaryaminomethyl-2-oxazolidone.

The reaction is preferably performed in the presence of a small quantity (1% will serve, but 10% is preferred) of a strong acid. Suitable acids which can be employed in the practice of our invention are sulfuric, hydrochloric, nitric, phosphoric, chloroacetic, p-toluenesulfonic and other like acids. The reaction is carried out in a hydrolytic medium. While the reaction can be carried out in water, it is preferable, in order to facilitate solution of all reactants, to employ inert solvents or diluents. Suitable organic solvents which may be employed in this connection include methanol, ethanol, acetic acid, dimethylformamide and dimethylsulfoxide. The reaction may be promoted by heating.

In the practice of our invention a nitrofuran represented by the formula:

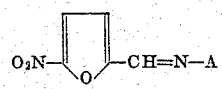

wherein:

A represents a radical selected from the group consisting of ureido, 2,4-dioxo-1-imidazolidyl, 2-oxo-3-oxazolidyl, and 2-oxo-5-(N-morpholinyl)-methyl-3-oxazolidyl, is prepared by reacting under the influence of heat in an acidified aqueous medium 5-nitro-2-furaldoxime and a compound selected from the group consisting of hydrazine compounds and derivatives thereof hydrolyzable thereto represented by the formula:

BM wherein:

B represents a radical selected from the group consisting of amino, lower alkanoylamino, lower alkylideneamino, cyclohexylideneamino and benzylideneamino, and
M represents a radical selected from the group consisting of 1-carboxy (lower) alkylureido, 2,4-dioxo-1-imidazolidyl, 2-oxo-3-oxazolidyl, 2-oxo-5-(N-morpholinyl)methyl-3-oxazolidyl and, when B represents a radical selected from the group consisting of lower alkylideneamino, cyclohexylideneamino and benzylideneamino, ureido.

In order that our invention will be fully available to those skilled in the art, the following specific examples thereof are described briefly:

*Example I*

A mixture of 5 g. (0.032 mole) of 5-nitro-2-furaldoxime, 4.2 g. (0.036 mole) of acetone semicarbazone, 50 cc. of water and 5 cc. of sulfuric acid (d=1.84) is heated at about 90° C. for 1–2 hours. The mixture is filtered while hot to yield 5.3 g. of 5-nitro-2-furaldehyde semicarbazone and the filtrate cooled to yield an additional 0.3 g., of which, after washing thoroughly with isopropanol, 0.2 g. remained. Total yield=5.5 g. (87%); M.P.=238–240° C.

*Example II*

The procedure of Example I is followed except that benzaldehyde semicarbazone is substituted for acetone semicarbazone and 15 cc. of methanol are used to facilitate dissolution of reactants. 5-nitro-2-furaldehyde semicarbazone having a melting point of 239–241° C. is obtained.

*Example III*

The procedure of Example I is followed except that methyl ethyl ketone semicarbazone is substituted for acetone semicarbazone and 10 cc. of ethanol are used to facilitate dissolution of reactants. 5-nitro-2-furaldehyde semicarbazone having a melting point of 237–240° C. is obtained.

*Example IV*

The procedure of Example I is followed except that cyclohexanone semicarbazone is substituted for acetone semicarbazone and 15 cc. of isopropanol are used to facilitate dissolution of reactants. 5-nitro-2-furaldehyde semicarbazone, M.P. 238–240° C., is obtained.

*Example V*

An aqueous solution (about 7 liters) containing about 0.5 mole of 1-aminohydantoin sulfate, 8% acetic acid and 12% sulfuric acid is prepared essentially by the method of Traube and Hoffa [Ber., 31:167 (1898)]. To it are added 0.5 mole of 5-nitro-2-furaldoxime and about 150 cc. of ethanol. The mixture is heated at about 85–90° C. for about 30 minutes and then cooled to about 10° C. whereupon N-(5-nitro-2-furfurylidene)-1-aminohydantoin precipitates, and is filtered. The solid is well washed with water and ethanol and then dried at about 100° C. for a period of about 24 hours. The melting point is 270–272° C.

*Example VI*

53 g. of 2-semicarbazidoacetic acid are added to 296 g. of 25% hydrochloric acid and stirred at 75–80° C. for 30 minutes. 376 g. of water, 160 g. of isopropanol and 0.35 mole of 5-nitro-2-furaldoxime are added and the solution is stirred at 80–85° C. for 30 minutes. Upon cooling to about 15° C. a solid precipitates which is filtered and washed acid-free with water and finally with isopropanol. It is dried at about 100° C. There is obtained N-(5-nitro-2-furfurylidene)-1-aminohydantoin in about 85% yield having a melting point of 270–272° C. (with decomposition).

*Example VII*

In a one liter flask fitted with a Dean-Stark trap and reflux condenser are placed 77 g. (0.669 mole) of 1-aminohydantoin and 400 ml. of cyclohexanone. The 1-aminohydantoin dissolves on heating and the solution is refluxed for one and one-half hours during which time 14.1 ml. (theo.=12.05 ml.) of water are collected. The product crystallizes on cooling. The large white crystals are collected by filtration and washed with benzene. The yield is 123 g. (95%), M.P. 180–181°. The 1-cyclohexylideneaminohydantoin thus obtained may be recrystallized from hot water.

To a suspension of 6.5 g. (0.033 mol.) of 1-cyclohexylideneaminohydantoin and 5.2 g. (0.30 mol.) of 5-nitro-2-furaldoxime in 100 cc. of water are added 9.5 cc. of sulfuric acid (d=1.84). This is heated with stirring at steam bath temperature for one-half hour. During that time yellow needles of solid separate. The solid is collected by filtration, washed with about 400 cc. of water, then about 25 cc. of isopropanol, and dried at 100° C. for two hours. The yield of N-(5-nitro-2-furfurylidene)-1-aminohydantoin is 97–98%.

*Example VIII*

To a solution of 18.9 gms. (0.166 mole) n-heptaldehyde in 25 ml. of isopropanol is added, with stirring, a solution of 19.1 gms. (0.166 moles) of 1-aminohydantoin in 110 ml. water acidified with concentrated HCl. The heavy white precipitate formed is filtered and washed, until acid free, with small amounts of water and ether. The yield of N-(n-heptylidene)-1-aminohydantoin is 14 g. of M.P. 150° C. (with decomposition). This may be recrystallized from dimethylformamide.

A mixture of 2.5 g. (0.016 mol.) of 5-nitro-2-furaldoxime, 3.9 g. (0.018 mol.) of N-(n-heptylidene)-1-aminohydantoin and 5 cc. of sulfuric acid (d=1.84) is placed in a 250 cc. beaker. It is heated with stirring at steam bath temperature for about 1.5 hours. Upon cooling, a solid precipitates which is collected by filtration, washed with water, isopropanol and ether in turn and dried at 110° C. for four hours. There is obtained N-(5-nitro-2-furfurylidene)-1-aminohydantoin in 96–98% yield.

*Example IX*

Benzaldehyde (53 g.) is dissolved in a solution of 500 cc. of water and 250 cc. of ethanol and 70 g. semicarbazidoacetic acid added thereto. The mixture is heated on a steam bath for ½ hour and then cooled. The solid obtained is dissolved in dilute caustic solution, filtered and the filtrate acidified. The solid which precipitates is collected and washed with water. There are obtained 69 g. (M.P. 222.5–223.5° C.) of 1-benzylidene-2-carboxymethyl semicarbazide.

10 g. of 1-benzylidene-2-carboxymethyl semicarbazide are added to 100 g. polyphosphoric acid and 50 ml. concentrated sulfuric acid. The temperature rises to 60° C. Heat is supplied as needed to maintain a temperature of about 60–65° C. for one-half hour. The reaction mixture is poured into 400 cc. of ice water and the precipitated solid is collected and washed with water. There are obtained 6 g. (M.P. 230–249° C.) of N-benzylidene-1-aminohydantoin. This may be recrystallized from nitromethane.

A mixture of 2 g. of N-benzylidene-1-aminohydantoin, 2 g. of 5-nitro-2-furaldoxime and 40 cc. of 20% aqueous sulfuric acid is heated at reflux for about one-half hour. The reaction mixture is cooled and 30 cc. of isopropanol added. The solid is collected and washed with water and isopropanol. There is obtained 2 g. of N-(5-nitro-2-furfurylidene)-1-aminohydantoin (M.P. 266–269° C. with dec.).

*Example X*

In 212 cc. of water are mixed 21.2 g. (0.112 mole) of N-(benzylidene)-3-amino-2-oxazolidone, 8.93 g. of concentrated sulfuric acid and 23.4 g. (0.15 mole) of 5-nitro-2-furaldoxime. This mixture is heated to effect hydrolysis of the reactants and removal of benzaldehyde. About 1–2 hours are required. When the greater portion of the benzaldehyde has been removed, 50 cc. of isopropanol are added to the mixture and heating at reflux carried out briefly. The solid which is present is filtered while the solution is hot and is washed with water and isopropanol and then dried. There is obtained N-(5-nitro-2-furfurylidene)-3-amino-2-oxazolidone in a yield of about 90–93% having a melting point of 254–256° C. (with decomposition).

*Example XI*

A mixture of 3-amino-2-oxazolidone (0.5 mole), 40 cc. of ethanol, 240 cc. of water, 38 g. of concentrated sulfuric acid and 5-nitro-2-furaldoxime (0.52 mole) is stirred at reflux temperature for about one hour. It is cooled and the yellow solid which precipitates is filtered, washed with ethanol and then dried. There is obtained N-(5-nitro-2-furfurylidene)-3-amino-2-oxazolidone in 75–80% yield having a melting point of 255–257° C. (with decomposition).

*Example XII*

In a 500 cc. flask are placed 100 cc. of water, 47 cc. of isopropanol, 23 g. of concentrated sulfuric acid and 47 g. (0.305 mol.) of 5-nitro-2-furaldoxime. The mixture is heated to 50° C.

To the mixture are added 31 g. (0.315 mol.) of 3-amino-2-oxazolidone dissolved in 75 cc. of water. The mixture is heated to about 80° C., with stirring at this temperature for about 1 hour. Upon cooling to 10° C. a solid is obtained which is washed with cold water and then with 50 ml. cold isopropanol. There are obtained 64 g. of N-(5-nitro-2-furfurylidene)-3-amino-2-oxazolidone, M.P. 258–260° C. (with decomposition).

*Example XIII*

To 10 cc. (10.2 g., 0.1 mole) of acetic anhydride are added portionwise over a ten-minute period with stirring 10.2 g. (0.1 mole) of 3-amino-2-oxazolidone. The reaction temperature after complete addition is about 70° C. This temperature is maintained for about 5 min. by heating on a steam bath. After cooling, the white solid mass is broken up and recrystallized from 50 cc. of isopropanol to give 12.4 g. (86% yield; M.P. 120.5–121.5° C.) of 3-acetamido-2-oxazolidone.

5-nitro-2-furaldoxime (5 g., 0.032 mole) and 5 g. (0.034 mole) of 3-acetamido-2-oxazolidone in 50 cc. of water are treated with 5 cc. of sulfuric acid (d=1.84) and heated at steam bath temperature. After approximately 5 min. a yellow solid separates. The mixture is heated for 40 minutes, cooled, the solid filtered, rinsed with water, then ethyl alcohol and dried at 110° C. to give 6.95 g. (96% yield; M.P. 257–8° C.) of N-(5-nitro-2-furfurylidene)-3-amino-2-oxazolidone.

*Example XIV*

440 gms. morpholine (5.05 moles) are placed in a 2 liter, three-neck flask equipped with a thermometer and stirrer. 460 gms. epichlorohydrin (4.97 moles) are added at 40° C., cooling as necessary to hold the temperature at 40–45° C. This addition requires one-half hour. When the exothermic reaction is completed, as evidenced by a drop in temperature, 246 gms. sodium hydroxide in 640 cc. water are added, the temperature being held at 25–30° C. The product layer is separated from the salt layer for use in the next step.

1430 gms. of 85% hydrazine hydrate are heated to 90° C. and the product layer (813 gms.) from the above is added. The temperature is kept between 90–95° C. and the reaction mixture is heated at this temperature for about an additional hour. At the end of this time the excess hydrazine is distilled off and the residue is held for the next step. The weight of this residue is about 721 gms.

To 604 gms. of the above residue (largely 1-hydrazino-3-morpholinyl-2-propanol) are added 700 gms. diethyl carbonate and 114 gms. sodium methylate. The mixture is refluxed for about one hour, then cooled to 60° C. This reaction mixture is added to 6070 ml. of water, 1300 ml. of isopropanol, 870 gms. of concentrated sulfuric acid and 190 gms. of 5-nitro-2-furaldoxime. This is refluxed for about one hour, cooled and filtered. The filtrate is brought to pH=7.5 with concentrated ammonium hydroxide and the precipitated solid is collected, washed with water, then isopropanol, and dried to yield 138 gms. (M.P. 206–208° C.) of N-(5-nitro-2-furfurylidene)-3-amino-5-(N-morpholinyl) methyl-2-oxazolidone.

What is claimed is:

1. The process of preparing a nitrofuran represented by the formula:

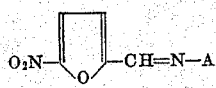

wherein:

A represents a radical selected from the group consisting of ureido, 2,4-dioxo-1-imidazolidyl, 2-oxo-3-oxazolidyl, and 2-oxo-5-(N-morpholinyl)methyl-3-oxazolidyl, which comprises reacting under the influence of heat in an acidified aqueous medium 5-nitro-2-furaldoxime and a member of the group consisting of hydrazine compounds and derivatives thereof hydrolyzable thereto represented by the formula:

BM wherein:

B represents a radical selected from the group consisting of amido, lower alkanoylamino, lower alkylideneamino, cyclohexylideneamino, and benzylideneamino, and M represents a radical selected from the group consisting of 1-carboxy(lower)alkylureido, 2,4-dioxo-1-imidazolidyl, 2-oxo-3-oxazolidyl, 2-oxo-5-(N-morpholinyl)-methyl-3-oxazolidyl, and, when B represents a radical selected from the group consisting of lower alkylideneamino, cyclohexylideneamino and benzylideneamino, ureido.

2. The process of preparing 5-nitro-2-furaldehyde semicarbazone which comprises reacting under the influence of heat in an acidified aqueous medium 5-nitro-2-furaldoxime and acetone semicarbazone.

3. The process of preparing N-(5-nitro-furfurylidene)-1-aminohydantoin which comprises reacting under the influence of heat in an acidified aqueous medium 5-nitro-2-furaldoxime and 1-aminohydantoin.

4. The process of preparing N-(5-nitro-2-furfurylidene)-3-amino-2-oxazolidone which comprises reacting under the influence of heat in an acidified aqueous medium 5-nitro-2-furaldoxime and 3-amino-2-oxazolidone.

5. The process of preparing N-(5-nitro-2-furfurylidene)-3-amino-5-(N - morpholinyl)methyl-2-oxazolidone which comprises reacting under the influence of heat in an acidified aqueous medium 5-nitro-2-furaldoxime and 3-amino-5-(N-morpholinyl)methyl-2-oxazolidone.

6. The process of preparing N-(5-nitro-2-furfurylidene)-3-amino-2-oxazolidone which comprises reacting under the influence of heat in an acidified aqueous medium 5-nitro-2-furaldoxime and 3-acetamido-2-oxazolidone.

No references cited.

UNITED STATES PATENT OFFICE
CERTIFICATE OF CORRECTION

Patent No. 2,927,110                                 March 1, 1960

Gabriel Gever et al.

It is hereby certified that error appears in the printed specification of the above numbered patent requiring correction and that the said Letters Patent should read as corrected below.

Column 6, line 7, for "amido" read -- amino --.

Signed and sealed this 23rd day of August 1960.

(SEAL)
Attest:

KARL H. AXLINE
Attesting Officer

ROBERT C. WATSON
                                                                      Commissioner of Patents